United States Patent [19]
Kincheloe

[11] Patent Number: 4,973,082
[45] Date of Patent: * Nov. 27, 1990

[54] ROLL CAGE FOR PERSONAL MOTORIZED VEHICLES

[76] Inventor: Dan Kincheloe, P.O. Box 565, Kingston, Okla. 73439

[*] Notice: The portion of the term of this patent subsequent to Mar. 21, 2006 has been disclaimed.

[21] Appl. No.: 325,580

[22] Filed: Mar. 20, 1989

Related U.S. Application Data

[63] Continuation-in-part of Ser. No. 94,690, Sep. 9, 1987, Pat. No. 4,813,706.

[51] Int. Cl.[5] .............................................. B62D 25/06
[52] U.S. Cl. ..................................... 280/756; 296/78.1
[58] Field of Search ............... 280/748, 756; 296/78.1, 296/80, 38, 75

[56] References Cited

U.S. PATENT DOCUMENTS

| | | |
|---|---|---|
| 1,247,674 | 11/1917 | Hankinson ........................ 280/756 |
| 2,256,890 | 9/1941 | Brown et al. ........................ 296/80 |
| 2,921,799 | 1/1960 | Hatten ................................ 280/756 |
| 3,284,130 | 11/1966 | Michael ............................. 296/78.1 |
| 4,678,223 | 7/1987 | Kishi et al. ........................ 296/78.1 |

Primary Examiner—Kenneth R. Rice

[57] ABSTRACT

The present invention provides a protective crash cage, or roll cage, for use with ATV's. The roll cage of the present invention utilizes a rounded shape to provide automatic recovery from most "crashes". The cage is designed so that it can be retrofitted to existing ATV's. The addition, a special harness system is employed which acts as a web to support the driver without restricting his ability to control the ATV through movement of his body. The roll cage of the present invention is designed to contain the drive wheels of the ATV within its boundaries except when the ATV is in an upright and safe position. Otherwise, the drive wheels are removed from contact with the ground in a crash situation so as not to continue propelling the vehicle in an unsafe manner.

12 Claims, 7 Drawing Sheets

ROLL CAGE FOR PERSONAL MOTORIZED VEHICLES

BACKGROUND OF THE INVENTION

This application is a continuation-in-part of copending application Ser. No. 094,690 filed Sept. 9, 1987, now U.S. Pat. No. 4,813,706.

FIELD OF THE INVENTION

This invention relates to the field of roll cages for personal motorized vehicles and in particular to roll cages which can be attached to existing all terrain vehicles (ATV's).

BACKGROUND ART

ATV's are small motorized vehicles having oversized tires suitable for off road use. Also known as "three wheelers" and "four wheelers", ATV's have enjoyed wide popularity as a recreational vehicle since their introduction. The ruggedness and utility of ATV's permits them to travel rough terrain including very steep and hilly areas. Their very accessibility, though, has resulted in an increased potential for accidents hazardous to the driver of the vehicle. For example, in hill climbing, the driver is forced to lean substantially forward on the machine so as to keep the center of gravity such that the ATV will not tip backwards. However, if the center of gravity is not shifted forward, the ATV will tip backward, often landing on the driver and pinning him to the ground. As ATV's are quite heavy, the potential for injury is very serious.

Prior art attempts at producing a safe off road machine have resulted in "dune buggy" like assemblies in which the entire chassis is essentially one large roll cage. Such vehicles are also known as "baja" buggies. However, these dune buggies and baja buggies do not perform, nor are they intended to perform, the same functions as an ATV. First, such buggies are not equipped to traverse rocky terrain, streams or steep slopes.

Secondly, dune buggies have a low center of gravity such that the driver must sit very low to the ground, restricting his viewing area. The very nature of use of an ATV requires that the driver sit high in the seat so that a comprehensive view of the surrounding terrain is available to avoid potentially dangerous situations. In addition, the engine of an ATV is located beneath the driver's seat, adding to the height of the ATV.

Further, dune buggy type assemblies have a seat back so that a shoulder strap or harness may be attached to the seat back itself. On an ATV, no seat back is provided so that no shoulder harness connection is available.

Also, since the roll cage of the dune buggy is unitary with the chassis itself, it is not "retrofittable". Therefore, the dune buggy provides no protection for existing vehicles lacking a roll cage. Finally, the roll cages of dune buggies are designed so that the drive wheels remain outside of the roll cage. In an accident, the wheels will tend to continue spinning, causing additional damage and propelling the vehicle in an uncontrolled and dangerous manner.

Therefore, it is an object of the present invention to provide a roll cage for ATV's which is retrofittable to existing ATV's.

It is a further object of the present invention to provide a roll cage for ATV's which allows adequate visibility for a driver.

It is still another object of the present invention to provide a roll cage for ATV's having a means for harnessing a driver in a secure manner.

It is yet another object of the present invention to provide a roll cage for ATV's which permits the drive wheels to contact the ground only when the ATV is in an upright "safe" position.

It is a further object of the present invention to protect the feet of the driver of an ATV from injury during the operation of the vehicle or in the event of an accident.

Other objects and features of the present invention will be made obvious from the following description.

SUMMARY OF THE INVENTION

The present invention provides a protective crash cage, or roll cage, for use with personal motorized vehicles, including ATV's. The roll cage of the present invention utilizes a rounded shape to provide automatic recovery from most "crashes". The cage is designed so that it can be retrofitted to existing ATV's. In addition, a special harness system is employed which acts as a web to support the driver without restricting his ability to control the ATV through movement of his body. Protective foot cages are provided as an integral part of the roll cage to protect the driver's feet and ankles. The roll cage of the present invention is designed to contain the drive wheels of the ATV within its boundaries except when the ATV is an upright and safe position. Otherwise, the drive wheels are removed from contact with the ground in a crash situation so as not to continue propelling the vehicle in an unsafe manner.

DETAILED DESCRIPTION OF THE PREFERRED EMBODIMENTS

Figure 1:
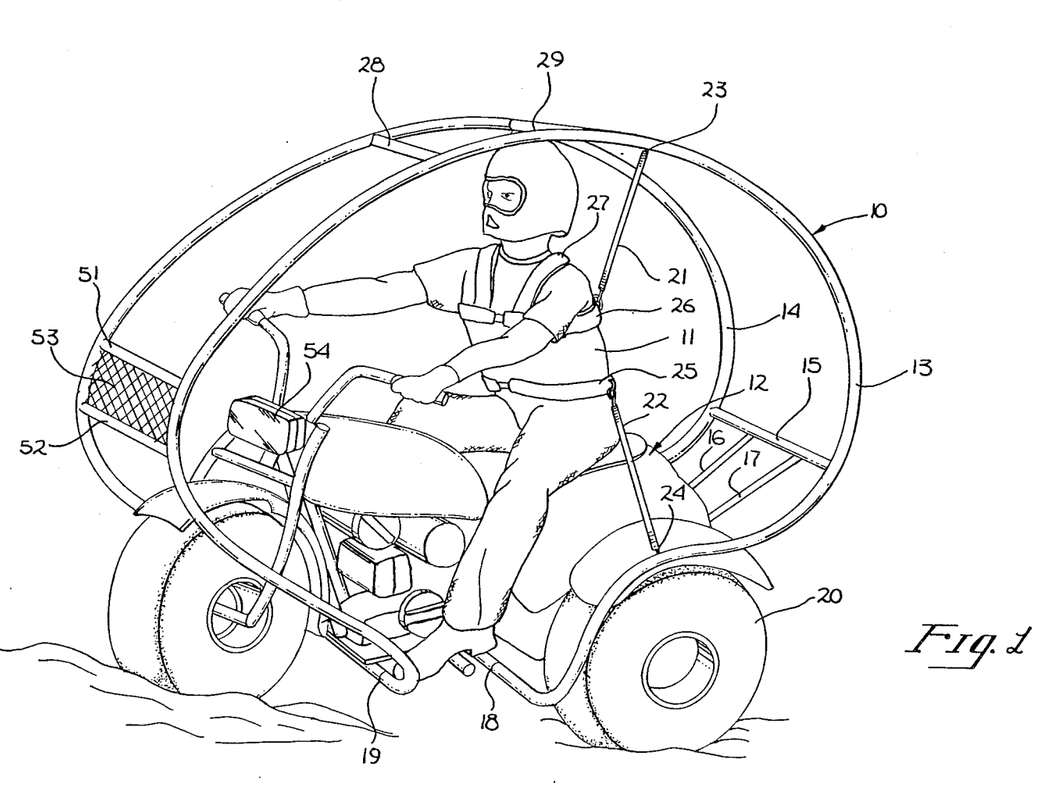
FIG. 1 is a perspective view of a preferred embodiment of the present invention as attached to an ATV.

A preferred embodiment of the present invention is illustrated generally in FIG. 1, where roll cage 10 is shown coupled to a typical three wheel ATV 12. The shape of the cage 10 is defined by two side rail members 13 and 14. Side rail member 13 is a large loop coupled to one side of the ATV at locations 18 and 19 near the foot of the driver 11. Side rail member 14 is similarly coupled to ATV 12 on the other side of the ATV (not shown). The side rail members 13 and 14 are coupled together with cross members 15, 28 and 29. These members, in the preferred embodiment, are welded to side rail members 13 and 14 and provide rigidity to the roll cage 10. Support members 16 and 17 are coupled substantially orthogonally to cross member 15 to provide a luggage rack area of the roll cage 10.

Figure 2:
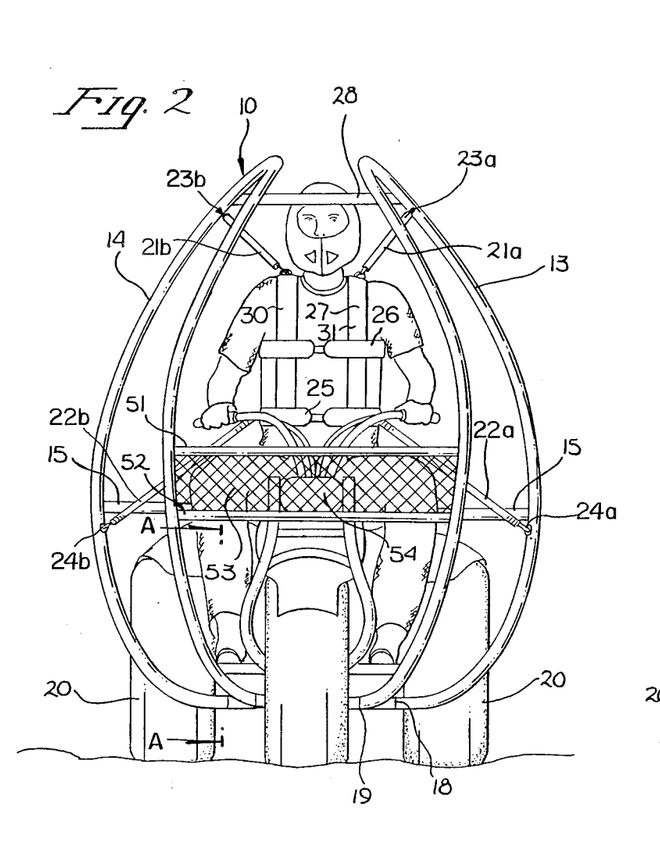
FIG. 2 is a front view of the invention as shown in FIG. 1.
Figure 3:
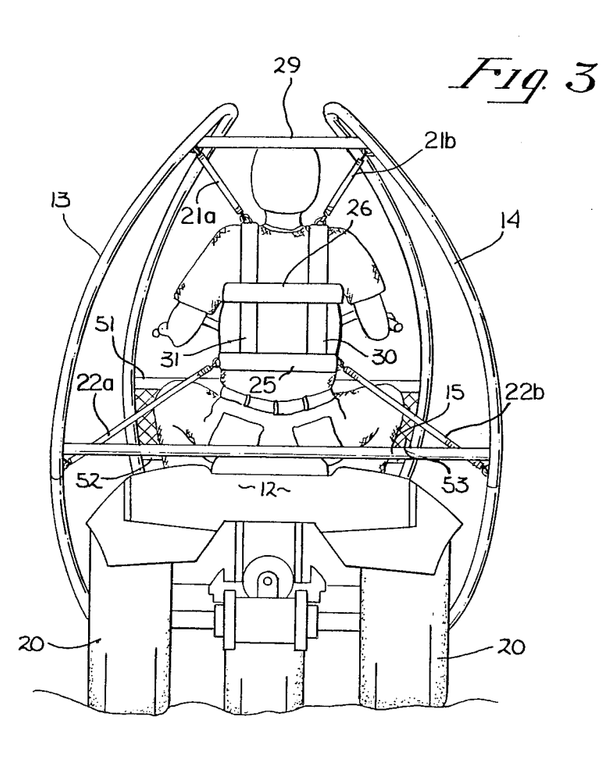
FIG. 3 is a back view of the embodiment shown in FIG. 1.

In order to restrain the driver 11 within the roll cage 10 during an accident, a harness 27 is provided. As best seen in FIGS. 2 and 3, the harness of the preferred embodiment comprises belt 25 which is worn around the rider's waist, belt 26 which is worn around the rider's chest below the arms, and interconnecting straps 30 and 31. The harness system is suspended within the protective enclosure of roll cage 10 as will be subsequently described. Belts 25 and 26 and straps 30 and 31 are made of a high strength material such as a nylon webbing similar to the material used for fabricating automotive seat belts. Belts 25 and 26 and at least the shoulder portions of straps 30 and 31 are preferably padded for the driver's comfort and to reduce the possibility of localized trauma to the trunk, spine and rib cage of the rider in the event of an accident. In the preferred embodiment of the invention, a soft, shock absorbing foam padding is used to cover the load transmitting portions of harness 27.

Harness 27 is suspended within roll cage 10 by a system of elastic straps which act to absorb impacts resulting from a vehicle accident or rollover. Elastic straps 21a and 22a are coupled to side rail 13 at mounting locations 23a and 24a, respectively. Similarly disposed elastic straps 21b and 22b are coupled to side rail 14 at locations 23b and 24b, respectively. Elastic straps 21a and 21b are coupled to harness straps 30 and 31, respectively. Elastic straps 22a and 22b are coupled to waist belt 25. Thus, it can be seen that rider 11, when appropriately secured within harness 27, is restrained within roll cage 10 by a four way opposing system of elastic restraints. This insures that rider 11 will not be ejected from within the protective envelope of roll cage 10, nor will he be thrown against the structural members of roll cage 10 in the event of an accident. Furthermore, the connection points between the elastic straps and the harness are widely separated so that loads transmitted through the elastic straps are distributed over the entire trunk of the rider.

The harness system is designed so that the driver 11 is restrained and protected within the roll cage 10 without affecting movement of his body. By utilizing elastic cords for coupling the harness to the roll cage itself, the driver may still lean left or right, forward or backward to aid in controlling the attitude of the ATV. Particularly during turns, it is important for a driver to lean in the correct direction to prevent tipping of the ATV. Further, because the side rails 13 and 14 are curved so as to extend beyond the boundaries of the ATV itself, the driver 11 may lean substantially in either of the left or right directions without exiting the protective confines of the roll cage 10.

If desired, the chest belt 26 and waist belt 25 may include buckles for quick release. Alternatively, the elastic members may be decoupled from the harness itself to allow exit of the driver. However, this is generally not desireable since the safety advantages of the harness may thereby be defeated by failing to attach the elastic members properly or by not wearing the harness at all. It is much preferred that the harness remain as an integral part of the roll cage. Furthermore, it is preferred that the harness be disposed within the roll cage so that its use by the driver is encouraged. For example, the harness of the present invention is suspended so that it is inconvenient for a rider to operate the ATV without wearing the harness, owing to its placement at the normal sitting position of the driver. If desired, a second harness may be provided for a passenger.

As can be seen in FIG. 1, the roll cage 10 is substantially elliptical in shape when viewed from the side. This unique shape aids in accident recovery during two of the most typical ATV accidents, namely, pitching the machine backward when accelerating up a steep hill, or pitching the machine forward when striking an object while heading downhill. Because the roll cage 10 is rounded, the ATV may complete a complete flip in either direction, landing on its wheels. If a complete flip is not achieved, it may be possible to "rock" the ATV so that it regains its "footing", i.e., so that it lands on its wheels.

A front view of the roll cage 10 is illustrated in FIG. 2. The side rail members 13 and 14 of the roll cage 10 are curved in a convex manner such that the rails 13 and 14 are closer together near the driver's head than at his waist. Thus, if the ATV is tipped transversely, it again may be "rocked" back into an upright position by the driver without having to get off the vehicle or out of the protective roll cage. Further, since the roll cage side rails 13 and 14 extend beyond the width of the ATV, the driver 11 does not strike the ground when the vehicle tips transversely. He remains safe and protected within the roll cage 10 where he can continue to act to prevent possible further injury and to correct the attitude of the ATV.

Still referring to FIG. 2, the lower portion of side rails 13 and 14 extend beyond the width of the drive wheels 20. Thus, if the ATV is tipped transversely, the drive wheels will lose contact with the ground so that the ATV remains stationary. This prevents possible dangerous injury of dragging a driver along rough terrain and allows the driver to concentrate on righting himself instead of controlling the direction of the vehicle from a dangerous and unsafe position. Further, the shape of the roll cage prevents portions of the ATV other than the wheels from touching the ground. This prevents damage to sensitive areas of the ATV, increasing its life and functionability.

It should be observed that the side members of the roll cage of the present invention are smoothly curved at the front and rear and are otherwise substantially parallel to the longitudinal axis of the vehicle and also to the vehicle's normal direction of travel. Furthermore, there are no vertical members on the sides of cage 10 as are commonly employed with roll cage structures for other types of vehicles. Any such vertical members in a roll cage for an ATV would present a hazard of catching on the ground, shrubbery, tree stumps, etc. in the event of an accident in which the vehicle rolls to the side. Such action between a frame member and an obstruction could suddenly arrest the vehicle's forward motion, thereby possibly increasing the amount of damage or injury sustained in such an accident. The design of the present invention, wherein structural members 13 and 14 are smoothly curved and substantially aligned with the longitudinal axis of the vehicle, tends to guide the vehicle along its established direction of travel in the event of a roll to the side, thereby dissipating energy in a less violent manner.

Cross member 28 is disposed between side rails 13 and 14 such that it lies substantially in front of the head of the driver 11. As can be seen in FIG. 2, side rails 13 and 14 define a large opening substantially in front of the driver 11. This large opening allows ease of visibility for the driver 11. However, this opening creates a "window" through which low hanging obstacles, such as trees, brush, etc. can enter the roll cage and strike the driver. The window of the roll cage of the present invention is obviously smaller than that of an open ATV (without a roll cage) so increased protection is provided. For additional protection cross member 28 is provided. The cross member 28 helps prevent injuries to the driver 11 by deflecting objects which may otherwise pass through the opening formed by side rails 13 and 14. The cross member 28 also deflects low hanging branches and trees from striking the face of the driver 11 during normal operation of the ATV.

Figures 4, 5:
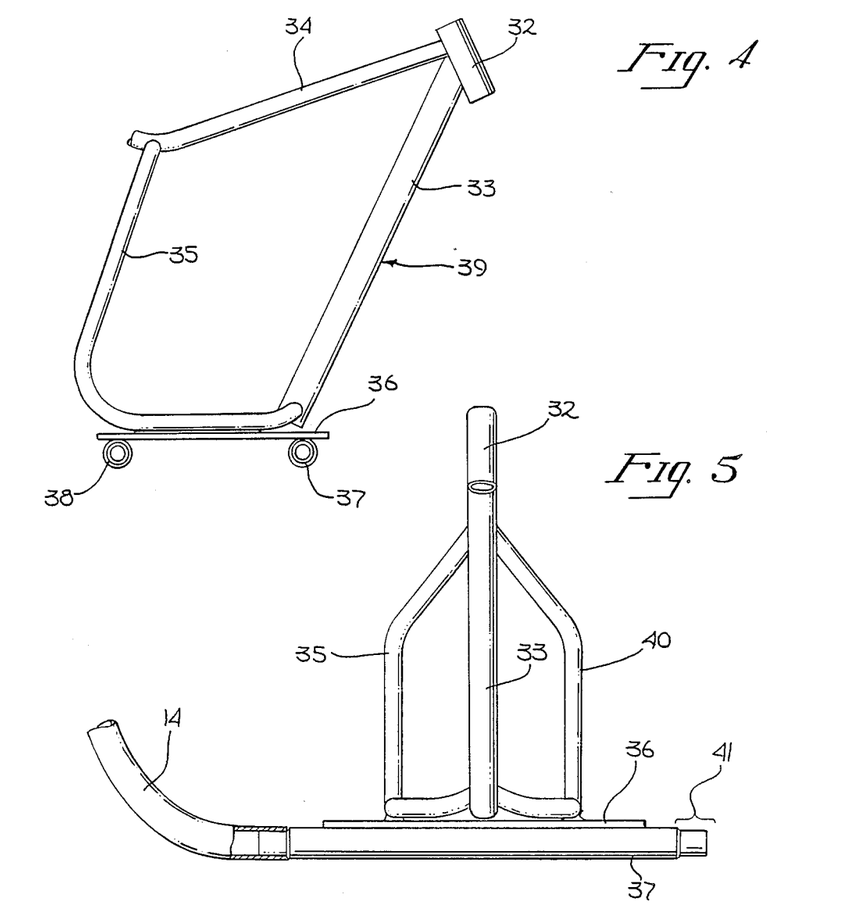
FIG. 4 is a side view of a frame section of the ATV taken along section lines 4—4 of FIG. 1.
FIG. 5 is a front view of the frame section of FIG. 4.

As noted previously, the present invention may be retrofitted to existing ATV's. A portion of a frame of the ATV of FIGS. 1, 2, 3 is illustrated in FIGS. 4 and 5. FIG. 4 is a cross-sectional view of a portion of the ATV frame taken along section line 4—4 of FIG. 2. The ATV frame 39 supports the engine of the ATV and, in the example shown, is used for mounting handle bars. The frame 39 includes a front member 33 on which is mounted a collar 32 for mounting of the handle bar steering assembly. A second elongated number 34 extends back and away from collar 32. Side frame members 35 and 40 (see FIG. 5) are coupled to elongated member 34 and to elongated member 33. Lower platform 36 is coupled to side members 35 and 40, typically by welding. Platform 36 forms a mounting plate and support for an engine of the ATV.

In order to facilitate the mounting of the roll cage 10 of the present invention to the ATV, mounting members 37 and 38 are welded on to the bottom of plate 36. Mounting members 37 and 38 are elongated metal tubes with a fitting on either end thereof. The fittings are male type fittings which are of smaller diameter than the remainder of the tube area. The mounting members should be placed so as not to interfere with any shift levers of the ATV. Referring to FIG. 5, fitting 41 of mounting number 37 is shown. Side rail member 14 is shown coupled to one end of mounting member 37. In the preferred embodiment, the inner diameter of side rail 14 is slightly larger than the outer diameter of fitting 41 of mounting member 37. Alternatively, the fittings may be of a female type to surround the ends of side rail members 13 and 14.

Figure 6:
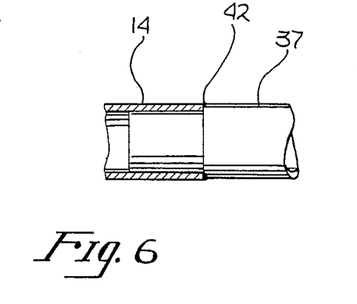
FIG. 6 is an enlarged cut away view of a fitting member of the present invention.
Figure 7:
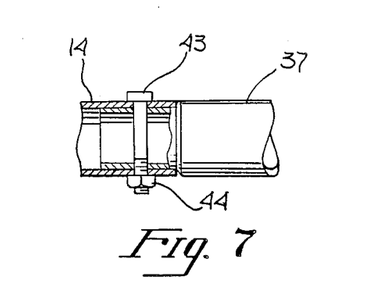
FIG. 7 is an enlarged cross-sectional view of an alternate embodiment of the fitting member of the present invention.

FIGS. 6 and 7 show two methods of coupling the roll cage 10 to the mounting members 37 and 38 of the present invention. Referring first to FIG. 6, the side rail member 14 is slidably mounted on fitting 41. The end of side rail member 14 abuts the remainder of mounting number 37 at location 42, where the diameter of mounting number 37 increases. Side rail member 14 may be permanently coupled to mounting member 37 by welding at location 42.

Alternatively, side rail member 14 may be removably coupled to mounting member 37. An opening is formed in fitting 41 and side rail member 14 so that a bolt 43 can be extended through the openings when side rail 14 is mounted on fitting 41. The bolt 43 extends through side rail 14 and is held in place with a nut 44.

Although the above mounting method has been discussed with respect to side rail member 14 and mounting member 37, it has equal application to side rail member 13 and mounting member 38. Further, any suitable means of attaching side rail members to the mounting members may be employed without departing from the scope of the present invention. Furthermore, side rail members 13 and 14 may be more permanently attached directly to the frame of the ATV, such as by welding.

Figure 8:
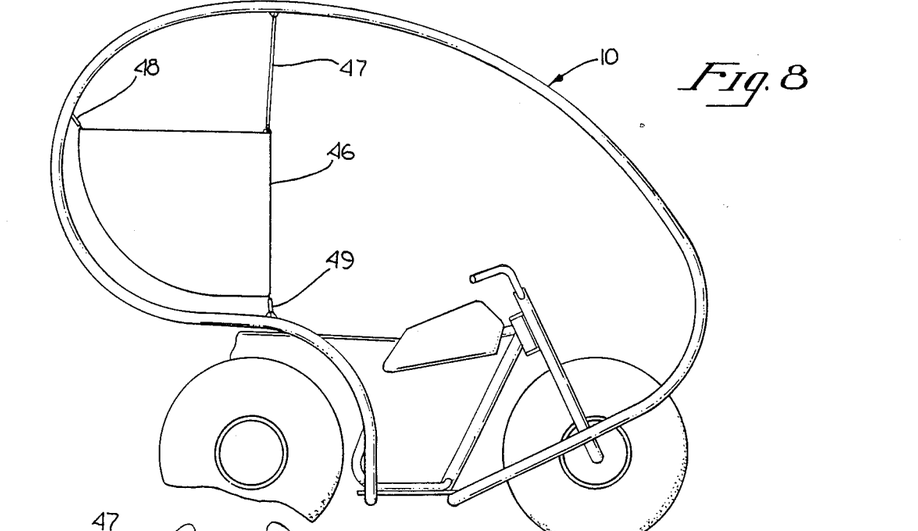
FIG. 8 is a side view of the present invention illustrating a harness system.
Figures 9, 10:
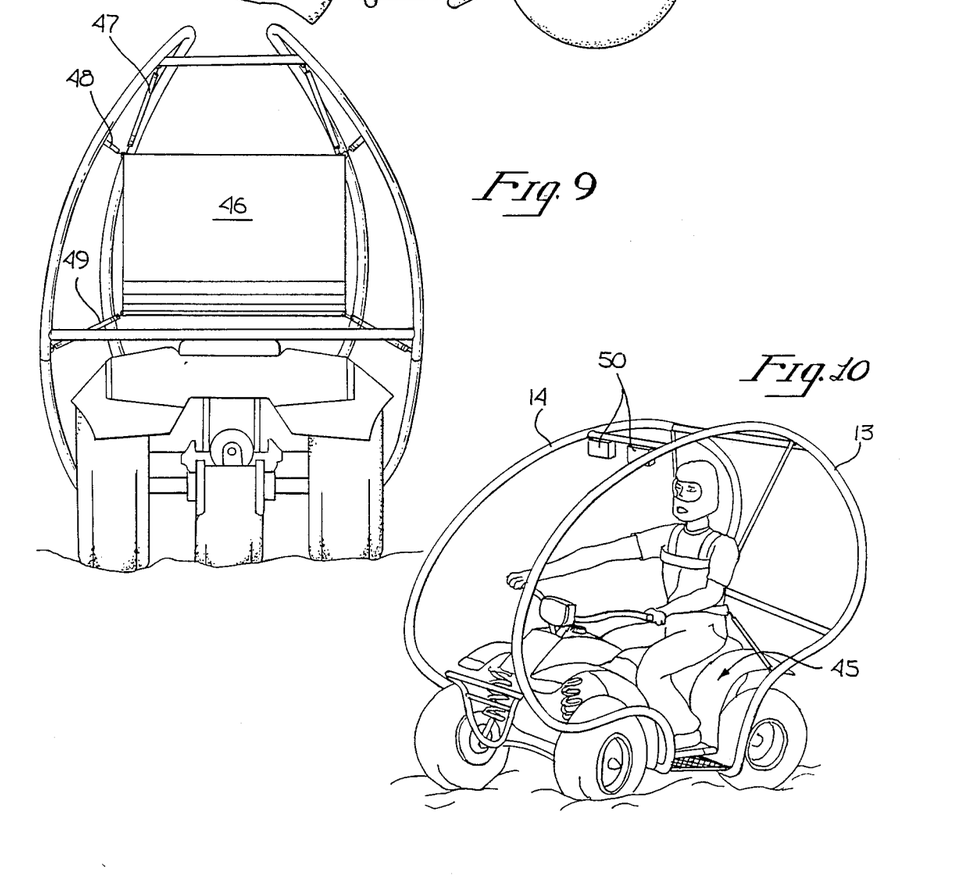
FIG. 9 is a rear view of the embodiment of FIG. 8.
FIG. 10 is a perspective view illustrating an alternate embodiment of the present invention as used with a four wheeled ATV.
Figure 11:
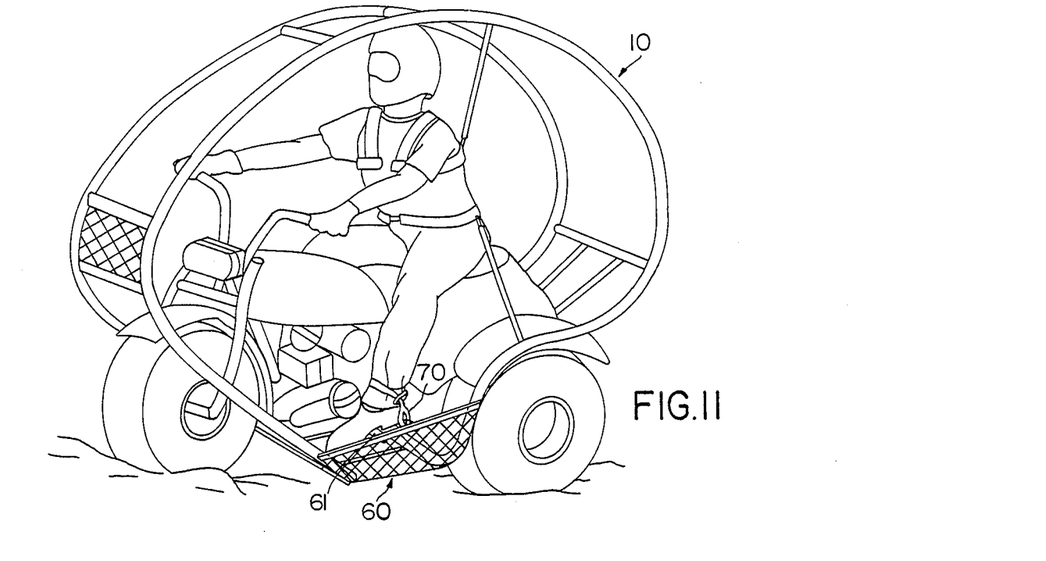
FIG. 11 is a perspective view of the present invention illustrating a protective foot cage.
Figure 12:
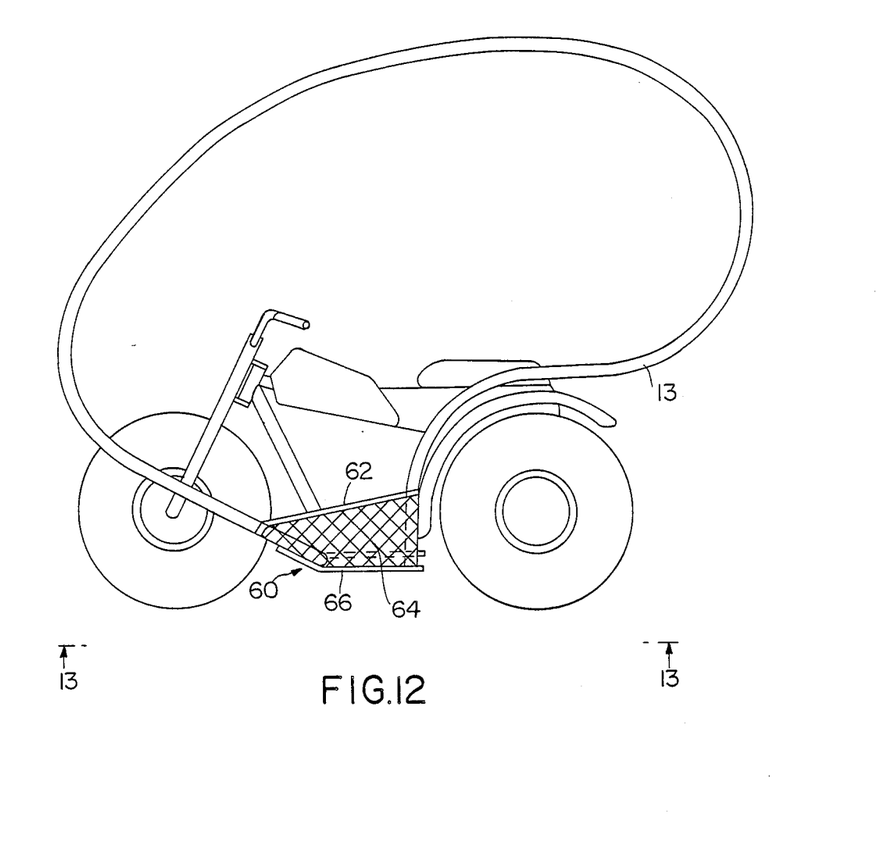
FIG. 12 is a side view of the embodiment of FIG. 11.
Figure 13:
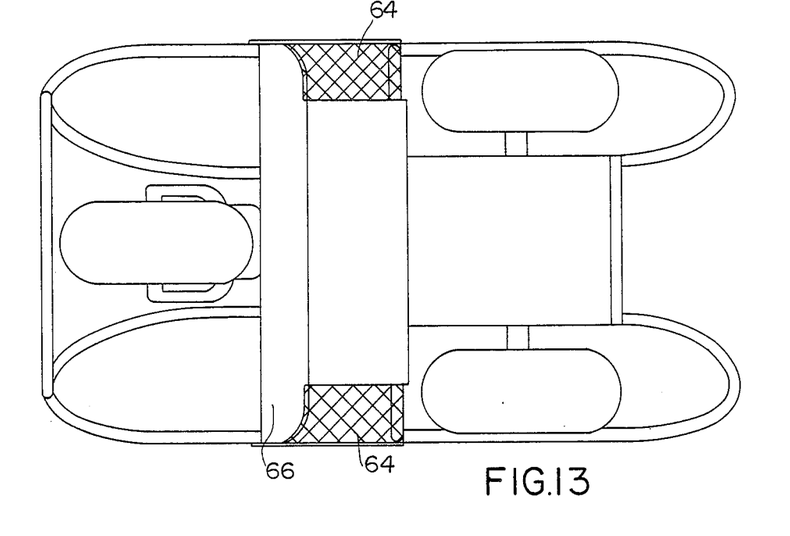
FIG. 13 is a bottom plan view of the embodiment of FIG. 11.

An alternative embodiment of the present invention is illustrated in FIGS. 8 and 9. A cargo pack 46 is mounted in the rear of the roll cage 10 and suspended within the frame. The cargo pack 46 is coupled to the roll cage 10 with elastic cords 47, 48 and 49 respectively. Cargo pack 46 may be of flexible material such as fabric (e.g. nylon) and may include pockets or webbing to securely retain stored items within.

Referring now to FIG. 10, the roll cage 10 of the present invention has equal application to four wheeled ATV's as shown. The mounting of the roll cage 10 on a four wheeled ATV is substantially identical to that of a three-wheeled ATV. The side rail members 13 and 14 of roll cage 10 are mounted such that they extend beyond the front two wheels of a four wheeled ATV so that the wheels do not contact the ground during a crash situation. If desired, head lights of fog lights 50 may be mounted on cross member 28 in any embodiment of the roll cage 10 of the present invention. Note that lights 50 are suspended from cross member 28 so as to be within the protective enclosure of cage 10, thereby minimizing the likelihood of damage in the event of an accident.

An optional feature of the present invention is a head lamp guard illustrated in FIGS. 1 and 2. A pair of cross bar members 51 and 52 are coupled to side rail members 13 and 14 approximately one foot apart and disposed near the front end of the ATV. Wire mesh 53 is coupled to cross bars 51 and 52 to form a protective screen in front of headlight 54 (see FIG. 2). The protective screen prevents branches and other foreign objects from damaging headlight 54 by preventing contact with the headlight. Because wire mesh is used, there is no loss of effectiveness of the headlight in night time use. In addition, visibility of the drive is maintained because of the see-through nature of the wire mesh 53. If desired, cross bar 51 may be mounted higher than shown in the figures to provide the driver with greater protection from low-hanging branches and other obstacles. The screen has equal application when the present invention is used with four wheelers and other personalized motor vehicles such as snowmobiles.

The roll cage 10 is comprised of metal in the preferred embodiment but may be of any material of adequate strength, such as hard plastic. Although the present invention has been described with respect to ATV's, it has equal application to all personal motorized vehicles, such as snowmobiles, etc. The roll cage, for best effectiveness, should be disposed outside the drive means of the vehicle (wheels on ATV's, treads on snowmobiles, etc.)

Referring now to FIGS. 11–14, an optional feature of the present invention for affording greater protection to the feet of a driver is illustrated. ATV's of the type with which the present invention is employed typically provide a foot rest 61 upon which the drive may place his foot during normal operation of the vehicle. Although roll cage 10 as heretofore described provides substantial protection to the upper body of the driver in the event of a roll over or other accident, it is possible that a driver's foot may become disengaged from foot rest 61 during an accident and for the driver's leg to extend outside of the envelope of safety afforded by cage 10. In order to provide a more positive means of protecting the driver's feet, a foot cage 60 is located on either side of cage 10.

A longitudinal member 62 is secured to side rail 13 in front of and behind foot rest 61. Member 62 provides structural rigidity for cage material 64, which is preferably an expanded metal or other suitable mesh-like material.

Figure 14:
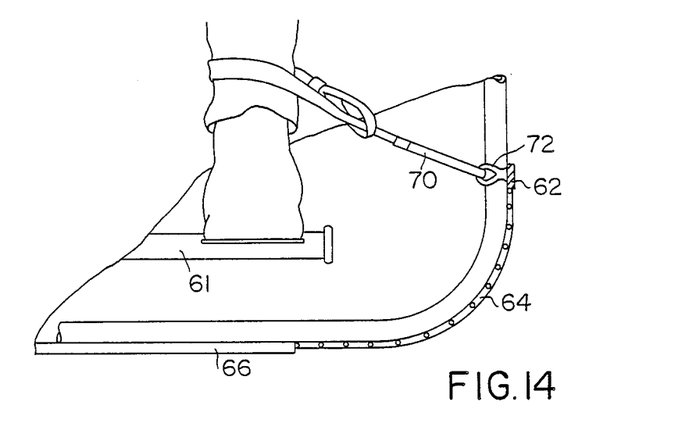
FIG. 14 is a detailed cross-sectional view of the embodiment of FIG. 11 illustrating an ankle harness.

Still greater protection of the driver's feet may be afforded by providing a positive restraint such as ankle strap 70. Although only strap 70 for the driver's left ankle is illustrated, it is to be understood that a corresponding strap is provided for the driver's right ankle. Each of ankle straps 70 is made of a suitably strong material such as nylon webbing and is secured to longitudinal member 62 by means of eye 72. By placing straps 70 around the driver's ankles, the driver's legs and feet are confined within the protective envelope of roll cage 10 and foot cage 60 even in the event of a fairly violent accident.

FIGS. 11–14 also illustrate the addition of protective plate 66 to the underside of cage 10. Plate 66 is preferably made of a heavy gauge steel or other metal so as to provide protection to the engine and frame of the vehicle in rough and rocky terrain. Plate 66 also provides a convenient means for reinforcing foot cage material 64. As shown, the forward portion of plate 66 conforms to side rails 13, thereby angling slightly upwards. This configuration enhances the vehicle's ability to "slide" over obstacles on the ground and also promotes "planing" when entering a body of water at speed.

Figure 15:
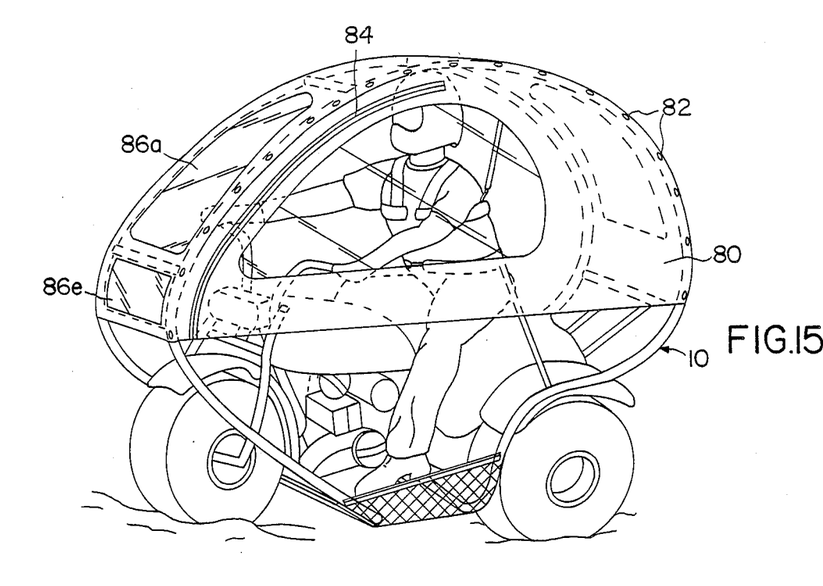
FIG. 15 is a perspective view of the present invention illustrating an inclement weather enclosure.
Figure 16:
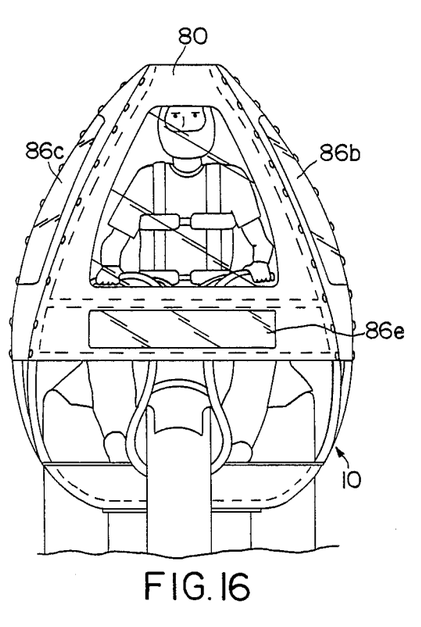
FIG. 16 is a front view of the embodiment of FIG. 15.
Figure 17:
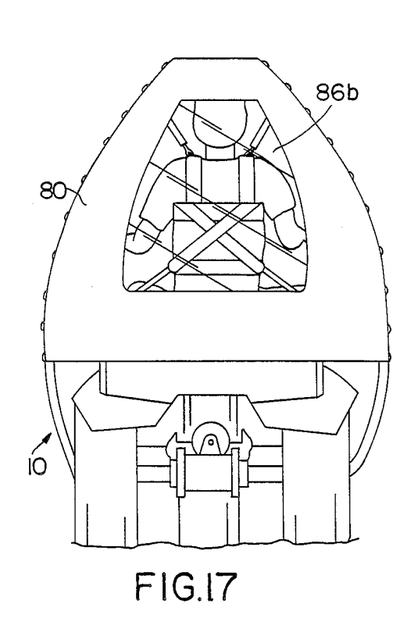
FIG. 17 is a rear view of the embodiment of FIG. 15.

Referring now to FIGS. 15–17, yet another optional feature of the present invention is illustrated. Since roll cage 10 provides a protective envelope fully enclosing the driver of the vehicle, it may be conveniently used to support a fabric enclosure 80 to provide protection from inclement weather. Enclosure 80 not only provides protection from inclement weather for the driver, but also serves as a protective cover for the vehicle when parked or stored. Enclosure 80 may be fabricated from canvas, nylon or any other suitable material and is preferably secured to roll cage 10 by means of fasteners such as snaps 82. A zipper 84 or other similar fastening device is incorporated into at least one side of enclosure 80 to provide convenient ingress and egress for the driver. Windows 86a, 86b, 86c and 86d are made of a suitable transparent plastic material and are provided at the front, rear and sides of enclosure 80 to provide the driver with adequate visibility for safe operation of the vehicle. Depending upon the placement of the vehicle's headlight, an additional window 86e may be provided so as not to obstruct the headlight beam.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. A roll cage for a personal motorized vehicle having a frame and drive means, said roll cage comprising:
   first and second side rail members coupled to said frame of said vehicle, said first and second side rail members extending above said vehicle so as to be substantially convex when viewed from a front and rear of said vehicle and substantially elliptical when viewed from a side of said vehicle;
   a plurality of cross mounting members coupled to said first and second side rail members;
   a first mounting member having first and second ends coupled to said frame of said vehicle and a second mounting member having third and fourth ends coupled to said frame, wherein said first side rail member is removably coupled to said first end of said first mounting member and said third end of said second mounting member, and wherein said second side rail member is removably coupled to said second end of said first mounting member and said fourth end of said second mounting member; and
   a foot cage disposed on each side of said roll cage for protecting a driver's feet.

2. The roll cage of claim 1 wherein said foot cage comprises a foot enclosure coupled to said respective side rail member and extending substantially between said first and second mounting members.

3. A roll cage for a personal motorized vehicle having a frame and drive means, said roll cage comprising:
   first and second side rail members coupled to said frame of said vehicle, said first and second side rail members extending above said vehicle so as to be substantially convex when viewed from a front and rear of said vehicle and substantially elliptical when viewed from a side of said vehicle;
   a plurality of cross mounting members coupled to said first and second side rail members;
   a first mounting member having first and second ends coupled to said frame of said vehicle and a second mounting member having third and fourth ends coupled to said frame, wherein said first side rail member is removably coupled to said first end of said first mounting member and said third end of said second mounting member, and wherein said second side rail member is removably coupled to said second end of said first mounting member and said fourth end of said second mounting member; and
   a substantially flat plate extending between said first and second mounting members for protecting an underside of said vehicle.

4. A roll cage for a personal motorized vehicle having a frame and drive means, said roll cage comprising:
   first and second side rail members coupled to said frame of said vehicle, said first and second side rail members extending above said vehicle so as to be substantially convex when viewed from a front and rear of said vehicle and substantially elliptical when viewed from a side of said vehicle;
   a plurality of cross mounting members coupled to said first and second side rail members; and
   a removable enclosure fastenable to at least upper portions of said first and second side rail members for providing a driver of said vehicle with protection from inclement weather.

5. The roll cage of claim 4 wherein said removable enclosure includes window means for affording said driver visibility out of said enclosure.

6. The roll cage of claim 4 wherein said removable enclosure includes slide fastener means disposed thereon to provide said driver with access to said vehicle.

7. A roll cage for an all terrain vehicle (ATV) having a frame, front and rear wheels, said roll cage comprising;
   a first mounting member having first and second ends coupled to said frame of said ATV;
   a second mounting member having third and fourth ends coupled to said frame;
   said first and second mounting members disposed substantially between said front and rear wheels of said ATV;
   a first side rail member coupled to said first end of said first mounting member and said third end of said second mounting member;
   a second side rail member coupled to said second end of said first mounting member and said fourth end of said second mounting member;
   first, second and third cross members coupled to said first and second side rails;
   first and second elastic cords coupled to said first side rail member;
   third and fourth elastic cords coupled to said second side rail member;
   harness means coupled to said first, second, third and fourth elastic cords, said harness means for restraining and supporting a driver in said ATV;
   said first and second side rail members being disposed so as to be convex when viewed from a front and rear of said ATV and substantially elliptical when viewed from a side of said ATV; and
   a foot cage disposed on each side of said roll cage for protecting the driver's feet.

8. The roll cage of claim 7 wherein said foot cage comprises a foot enclosure coupled to said respective side rail member and extending substantially between said first and second mounting members.

9. A roll cage for an all terrain vehicle (ATV) having a frame, front and rear wheels, said roll cage comprising;
   a first mounting member having first and second ends coupled to said frame of said ATV;
   a second mounting member having third and fourth ends coupled to said frame;
   said first and second mounting members disposed substantially between said front and rear wheels of said ATV;
   a first side rail member coupled to said first end of said first mounting member and said third end of said second mounting member;
   a second side rail member coupled to said second end of said first mounting member and said fourth end of said second mounting member;
   first, second and third cross members coupled to said first and second side rails;
   first and second elastic cords coupled to said first side rail member;
   third and fourth elastic cords coupled to said second side rail member;
   harness means coupled to said first, second, third and fourth elastic cords, said harness means for restraining and supporting a driver in said ATV;
   said first and second side rail members being disposed so as to be convex when viewed from a front and rear of said ATV and substantially elliptical when viewed from a side of said ATV; and;
   a substantially flat plate extending between said first and second mounting members for protecting an underside of said vehicle.

10. A roll cage for an all terrain vehicle (ATV) having a frame, front and rear wheels, said roll cage comprising;
    a first mounting member having first and second ends coupled to said frame of said ATV;
    a second mounting member having third and fourth ends coupled to said frame;
    said first and second mounting members disposed substantially between said front and rear wheels of said ATV;
    a first side rail member coupled to said first end of said first mounting member and said third end of said second mounting member;
    a second side rail member coupled to said second end of said first mounting member and said fourth end of said second mounting member;
    first, second and third cross members coupled to said first and second side rails;
    first and second elastic cords coupled to said first side rail member;
    third and fourth elastic cords coupled to said second side rail member;
    harness means coupled to said first, second, third and fourth elastic cords, said harness means for restraining and supporting a driver in said ATV;
    said first and second side rail members being disposed so as to be convex when viewed from a front and rear of said ATV and substantially elliptical when viewed from a side of said ATV; and
    a removable enclosure fastenable to at least upper portions of said first and second side rail members for providing a driver of said vehicle with protection from inclement weather.

11. The roll cage of claim 10 wherein said removable enclosure includes window means for affording said driver visibility out of said enclosure.

12. The roll cage of claim 10 wherein said removable enclosure includes slide fastener means disposed thereon to provide said driver with access to said vehicle.

* * * * *

UNITED STATES PATENT AND TRADEMARK OFFICE
CERTIFICATE OF CORRECTION

PATENT NO. : 4,973,082

DATED : 11/27/90

INVENTOR(S) : Kincheloe

It is certified that error in the above-identified patent and that said Letters Patent is hereby corrected as shown below:

On the Title page,

| | | |
|---|---|---|
| [57] Abstract, line 06 | delete "The" | insert --In-- |
| col. 06, line 34 | delete "of" | insert --or-- |
| col. 06, line 51 | delete "drive" | insert --driver-- |
| col. 07, line 05 | delete "drive" | insert --driver-- |

Signed and Sealed this

Twenty-ninth Day of December, 1992

*Attest:*

DOUGLAS B. COMER

*Attesting Officer*  *Acting Commissioner of Patents and Trademarks*